US011283224B1

(12) United States Patent
Wang et al.

(10) Patent No.: US 11,283,224 B1
(45) Date of Patent: Mar. 22, 2022

(54) ADAPTER MECHANISM

(71) Applicant: Ademco Inc., Golden Valley, MN (US)

(72) Inventors: Yao Wang, Shanghai (CN); Yongjun Chen, Shanghai (CN); Bin Shi, Shanghai (CN)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 17/067,883

(22) Filed: Oct. 12, 2020

(51) Int. Cl.
*H01R 13/60* (2006.01)
*H01R 13/73* (2006.01)
*H01R 43/26* (2006.01)

(52) U.S. Cl.
CPC ............. *H01R 13/73* (2013.01); *H01R 43/26* (2013.01)

(58) Field of Classification Search
CPC ................................ H01R 13/73; H01R 43/26
USPC .......................................................... 439/569
See application file for complete search history.

(56) References Cited

U.S. PATENT DOCUMENTS

| 5,613,863 | A | * | 3/1997 | Klaus | H01R 27/00 |
| | | | | | 439/131 |
| 5,634,806 | A | * | 6/1997 | Hahn | H01R 27/00 |
| | | | | | 439/172 |
| 5,684,689 | A | * | 11/1997 | Hahn | H01R 13/6675 |
| | | | | | 363/146 |
| 5,791,921 | A | * | 8/1998 | Lee | H01R 27/00 |
| | | | | | 439/103 |
| 5,973,948 | A | * | 10/1999 | Hahn | H01R 13/6675 |
| | | | | | 363/143 |
| 6,227,888 | B1 | * | 5/2001 | Hahn | H01R 27/00 |
| | | | | | 439/172 |
| 6,659,782 | B2 | * | 12/2003 | Wu | H01R 31/065 |
| | | | | | 439/131 |
| 6,669,495 | B2 | * | 12/2003 | Philips | H01R 31/065 |
| | | | | | 439/170 |
| 6,923,667 | B1 | * | 8/2005 | Chen | H01R 27/00 |
| | | | | | 439/172 |

(Continued)

FOREIGN PATENT DOCUMENTS

CN 201805110 U 4/2011

OTHER PUBLICATIONS

English Abstract and Machine Translation for Chinese Publication No. CN201805110U, published Apr. 20, 2011, 10 pgs.

*Primary Examiner* — Abdullah A Riyami
*Assistant Examiner* — Vladimir Imas
(74) *Attorney, Agent, or Firm* — Bredxikson & Byron, P.A.

(57) ABSTRACT

An adapter mechanism includes an electrical adapter and an attachment device. The electrical adapter includes an adapter housing and a pair of conductive prongs. The adapter housing includes a first complementary connector, and the pair of conductive prongs is configured to be inserted into an electrical outlet. The attachment device includes a fixation aperture and a second complementary connector. The attachment device is configured to move relative to the adapter housing between a retracted position and an extended position. When the attachment device is in the retracted position, the second complementary connector is uncoupled from the first complementary connector. When the attachment device is in the extended position, the fixation aperture is extended out from the adapter housing and the second complementary connector is coupled to the first complementary connector to secure the attachment device in place at the adapter housing.

20 Claims, 9 Drawing Sheets

(56) References Cited

U.S. PATENT DOCUMENTS

| | | | | |
|---|---|---|---|---|
| 6,942,508 | B2* | 9/2005 | Wong | H01R 24/30 |
| | | | | 439/171 |
| 7,008,246 | B2* | 3/2006 | Zhuge | H01R 13/6272 |
| | | | | 439/131 |
| 7,118,399 | B1* | 10/2006 | Wen | H01R 27/00 |
| | | | | 439/166 |
| 7,223,126 | B2* | 5/2007 | Ng | H01R 31/06 |
| | | | | 439/357 |
| 7,300,297 | B1* | 11/2007 | Wang | H01R 13/2442 |
| | | | | 439/173 |
| 7,489,952 | B2* | 2/2009 | Simoes | H01R 31/06 |
| | | | | 320/112 |
| 7,547,219 | B2* | 6/2009 | Zhuge | H01R 13/4534 |
| | | | | 439/173 |
| 8,087,946 | B2* | 1/2012 | Namiki | H01R 13/639 |
| | | | | 439/173 |
| 8,469,730 | B2* | 6/2013 | Garb | H01R 31/065 |
| | | | | 439/173 |
| 9,543,704 | B1* | 1/2017 | Hsu | H01R 13/645 |
| 9,985,397 | B2* | 5/2018 | Jiang | H01R 13/6675 |
| 10,601,194 | B1 | 3/2020 | Chien | |
| 2014/0177185 | A1* | 6/2014 | Poffenberger | H01R 9/16 |
| | | | | 361/752 |
| 2019/0109408 | A1* | 4/2019 | Maddens | H01R 31/06 |
| 2021/0210915 | A1* | 7/2021 | Galazin | H01R 24/68 |

\* cited by examiner

ADAPTER MECHANISM

TECHNICAL FIELD

This disclosure relates generally to adapter mechanisms and methods relating to such adapter mechanisms. More specifically, this disclosure describes adapter mechanism embodiments that can be configured to transition between installation configurations.

BACKGROUND

Electrical adapters are used by many electrical devices to convert one or more attributes of an electrical device or system to those of the electrical devices. For example, some electrical devices include an electrical adapter to modify power or signal attributes of a power supply system to be compatible with the power consumption characteristics of the electrical device. In such an example, the electrical adapter may provide the electrical device with a more stable power supply.

SUMMARY

This disclosure in general describes adapter mechanism embodiments and related methods. In particular, embodiments disclosed herein can facilitate transitioning an adapter mechanism from one installation configuration to another, different installation configuration.

Various regions can have different installation requirements for electrical adapters. For example, while some regions may require that an electrical adapter be solely plugged into an electrical outlet, other regions may require that an electrical adapter be fixed to a wall adjacent the electrical outlet in addition to be plugged into that outlet. Accordingly, for electrical adapters to comply with different installation requirements in different regions, different electrical adapter installation configurations can be needed. However, the costs associated with designing and manufacturing distinct electrical adapter installation structures can be significant and lead to resource inefficiencies.

Therefore, the present disclosure describes adapter mechanism embodiments that can facilitate multiple electrical adapter installation configurations that can comply with different installation requirements for electrical adapters. For example, certain adapter mechanism embodiments disclosed herein can transition an electrical adapter from one installation configuration adapted for a first installation requirement at a first region to another, different installation configuration adapted for a second, different installation requirement at a second region. In this way, such embodiments can allow for the manufacture of one electrical adapter installation structure that can, during installation of the electrical adapter, be selectively configured to meet different installations requirements. As a result, such embodiments can allow for reduced costs associated with manufacturing electrical adapters. In addition, such embodiments can simplify the installation process by reducing the number of different electrical adapter structures needed to meet various installation requirements due to the modular configuration of various adapter mechanism embodiments disclosed herein.

One embodiment includes an adapter mechanism. This adapter mechanism embodiment includes an electrical adapter and an attachment device. The electrical adapter includes an adapter housing and a pair of conductive prongs. The adapter housing includes a first complementary connector, and the pair of conductive prongs is configured to be inserted into an electrical outlet. The attachment device includes a fixation aperture and a second complementary connector. The attachment device is configured to move relative to the adapter housing between a retracted position and an extended position. When the attachment device is in the retracted position, the second complementary connector is uncoupled from the first complementary connector. When the attachment device is in the extended position, the fixation aperture is extended out from the adapter housing and the second complementary connector is coupled to the first complementary connector to secure the attachment device in place at the adapter housing.

In a further embodiment of the adapter mechanism, when the attachment device is in the retracted position, the fixation aperture interfaces with the adapter housing. For example, when the attachment device is in the retracted position the adapter housing blocks the fixation aperture from receiving a fixation element through the fixation aperture. The fixation aperture can be configured to receive a fixation element, for instance, to fix the electrical adapter to a wall adjacent the electrical outlet.

In a further embodiment of the adapter mechanism, the attachment device further includes a prong opening extending through the attachment device. The prong opening can be configured to receive the pair of conductive prongs to extend through the attachment device. In such an embodiment, the fixation aperture and the second complementary connector can be spaced apart on the attachment device by the prong opening.

Another embodiment includes a method of installing an adapter mechanism at an electrical outlet. The adapter mechanism includes an electrical adapter and an attachment device. The method includes the step of moving the attachment device, relative to an adapter housing of the electrical adapter, from a retracted position to an extended position. When the attachment device is in the retracted position, a second complementary connector of the attachment device is uncoupled from a first complementary connector of the adapter housing. When the attachment device is in the extended position a fixation aperture of the attachment device is extended out from the adapter housing and the second complementary connector is coupled to the first complementary connector to secure the attachment device in place at the adapter housing. The method further includes the step of plugging a pair of conductive prongs of the electrical adapter into an electrical outlet. The method also includes the step of fixing the electrical adapter to a wall adjacent the electrical outlet, via at least the fixation aperture, when the attachment device is in the extended position.

In a further embodiment of this method, the pair of conductive prongs can be plugged into the electrical outlet when the attachment device is in the extended position. And, in a still further embodiment of this method, when the attachment device is in the retracted position the fixation aperture interfaces with the adapter housing.

In a further embodiment of this method, the electrical adapter is fixed to the wall adjacent the electrical outlet, when the attachment device is in the extended position, by a fixation element placed through the fixation aperture.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

FIG. 1A is a perspective view of the adapter mechanism embodiment with an attachment device embodiment of the adapter mechanism in a retracted position, and FIG. 1B is a perspective view of the adapter mechanism embodiment with the attachment device in an extended position. FIG. 1C is a perspective view of an electrical adapter of the adapter mechanism embodiment. FIG. 1D is a perspective view of the attachment device embodiment.

FIG. 2A is a perspective view of the adapter mechanism embodiment with an attachment device embodiment of the adapter mechanism in a retracted position, and FIG. 2B is a perspective view of the adapter mechanism embodiment with the attachment device in an extended position. FIG. 2C is a perspective view of an electrical adapter of the adapter mechanism embodiment. FIG. 2D is a perspective view of the attachment device embodiment.

FIG. 3A is a perspective view of the adapter mechanism embodiment with an attachment device embodiment of the adapter mechanism in an extended position, and FIG. 3B is a perspective view of the adapter mechanism embodiment with the attachment device being moved to a retracted position.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1A:
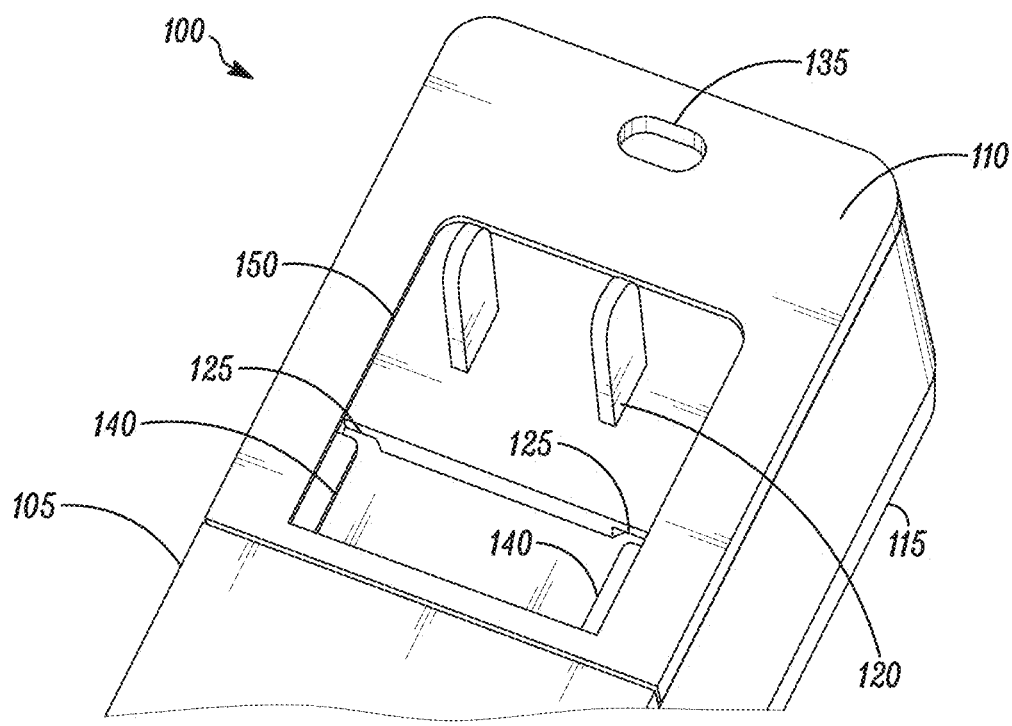
FIGS. 1A-1D illustrate one embodiment of an adapter mechanism.
Figure 1B:
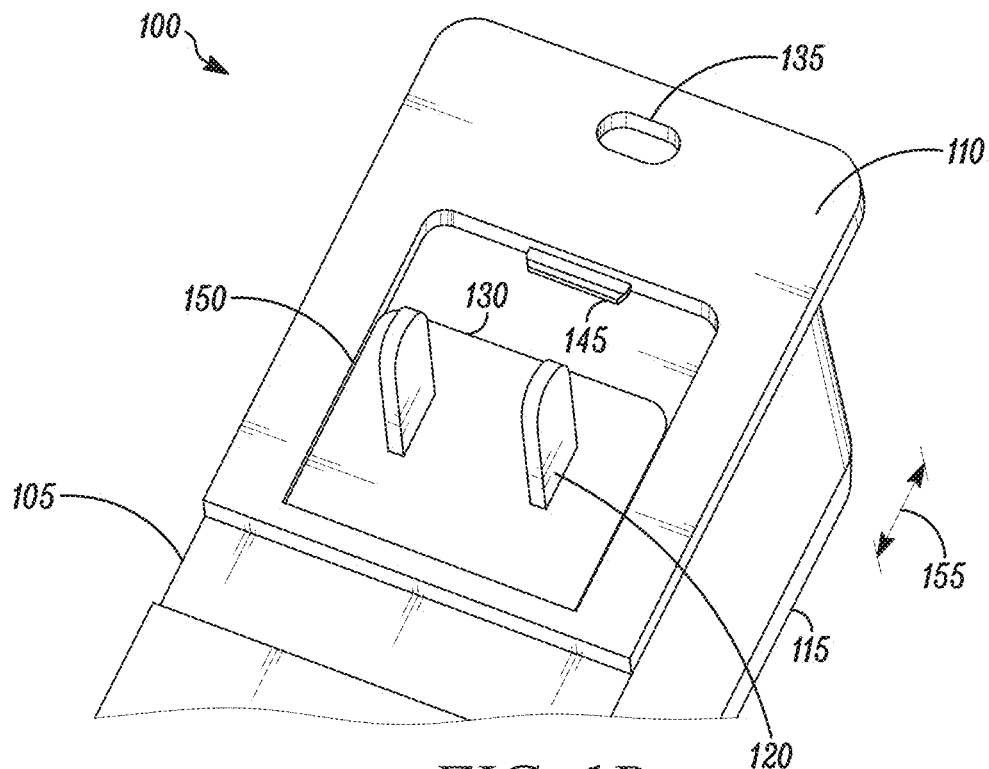

FIGS. 1A-1D show one embodiment of an adapter mechanism 100. The adapter mechanism 100 can include an electrical adapter 105 and an attachment device 110. As shown in FIGS. 1A and 1B, and as will be described further below, the attachment device 110 can be configured to move between a retracted position, an example of which is shown in FIG. 1A, and an extended position, an example of which is shown in FIG. 1B.

Figure 1C:
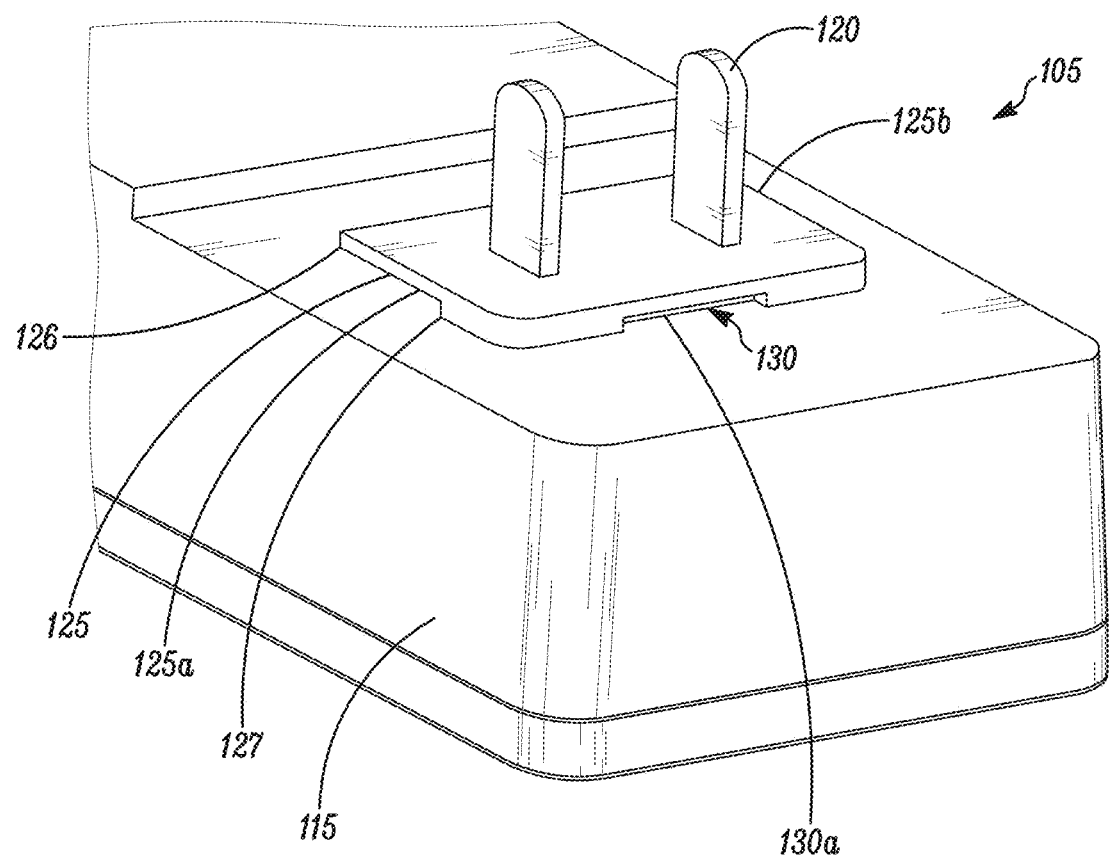

FIG. 1C illustrates a perspective view of the electrical adapter 105 in isolation. The electrical adapter 105 can include an adapter housing 115 and a pair of conductive prongs 120. The pair of conductive prongs 120 can be configured to be inserted into an electrical outlet so as to receive power from a power source accessible via the electrical outlet. The adapter housing 115 can include one or more components thereat configured to convert one or more attributes of the power source to those of an electrical device electrically connected to the electrical adapter 105. For example, one or more components at the adapter housing 115 can be configured to modify power or signal attributes of the power source to be compatible with the power consumption characteristics of the electrical device electrically connected to the electrical adapter 105. The adapter housing 115 can further include an electrical coupling (e.g., spaced apart from the pair of conductive prongs 120) for electrically connecting to the electrical device. Thus, the electrical adapter 105 can receive power from the power source via the pair of conductive prongs 120, modify one or more characteristics of the power received from the power source, and supply the modified power to an electrical device electrically coupled to the electrical adapter 105.

The adapter housing 115 can include one or more complementary connectors configured to couple to the attachment device 110. As shown in the illustrated embodiment, the adapter housing 115 can include a first complementary connector 125. The first complementary connector 125 can be configured to couple to the attachment device 110, for instance, when the attachment device 110 is in a particular position relative to the adapter housing 115. In the illustrated embodiment, the first complementary connector 125 is configured to couple to the attachment device 110 when the attachment device 110 is in an extended position so as to thereby secure the attachment device 110 in place at the adapter housing 115 when the attachment device 110 is in the extended position. In the illustrated embodiment, the first complementary connector 125 includes a first receptacle 125a and a second receptacle 125b that is spaced apart from the first receptacle 125a. Each of the first and second receptacles 125a, 125b can be defined by the adapter housing 115 (e.g., adjacent the pair of conductive prongs 120). In the illustrated embodiment, each of the first and second receptacles 125a, 125b is defined as a slot at the adapter housing 115. The slot defined by each of the of the first and second receptacles 125a, 125b is open at one end portion 126 of each of the first and second receptacles 125a, 125b and closed at a second, opposite end portion 127 of each of the first and second receptacles 125a, 125b.

The adapter housing 115 in the illustrated embodiment also includes a third complementary connector 130. The third complementary connector 130 can also be configured to couple to the attachment device 110, for instance when the attachment device 110 is in a particular position relative to the adapter housing 115. In the illustrated embodiment, the third complementary connector 130 is configured to couple to the attachment device 110 when the attachment device 110 is in a retracted position so as to thereby secure the attachment device 110 in place at the adapter housing 115 when the attachment device 110 is in the retracted position. In the illustrated embodiment, the third complementary connector 130 includes a third receptacle 130a that can be defined by the adapter housing 115 (e.g., adjacent the pair of conductive prongs 120). In the illustrated embodiment, the third receptacle 130a is defined as a slot at the adapter housing 115, and the third receptacle 130a is offset from each of the first and second receptacles 125a, 125b. In particular, as shown here, the third receptacle 130a is open at a side of the pair of conductive prongs 120 opposite the one end portion 126 of each of the first and second receptacles 125a, 125b.

Figure 1D:
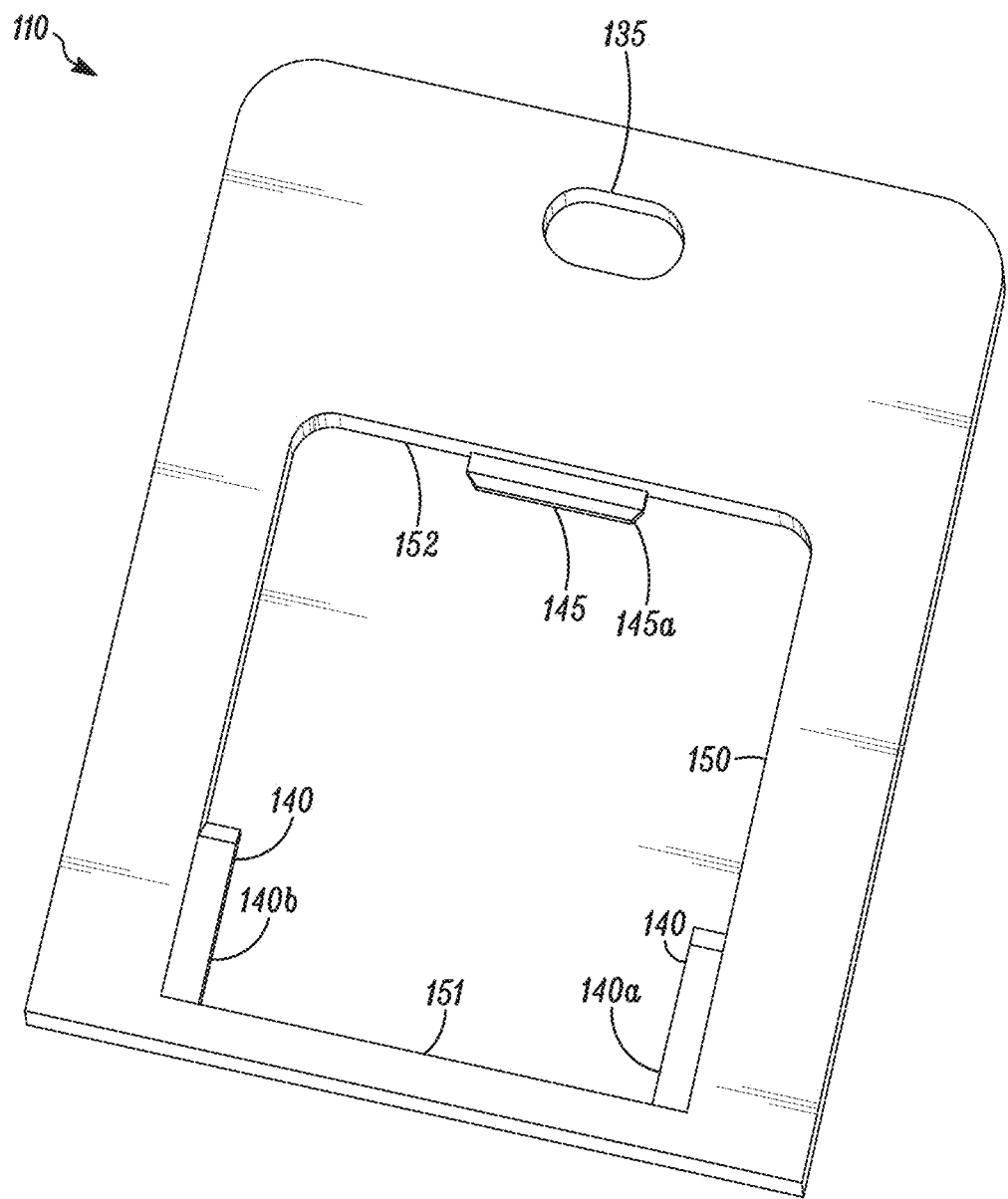

FIG. 1D illustrates a perspective view of the attachment device 110 in isolation. The attachment device 110 can include a fixation aperture 135. The fixation aperture 135 can be configured to receive a fixation element to fix the electrical adapter 105 to a wall adjacent an electrical outlet (e.g., into which the pair of electrical prongs 120 are configured to be inserted). Accordingly, the fixation aperture 135 can be sized so as to receive the fixation element, such as a screw, bolt, nail, other appropriate fixation element, therethrough. In some examples, depending on the type of fixation element that is to be used with the fixation aperture 135, the fixation aperture 135 can define threading for coupling to the inserted fixation element.

The attachment device 110 can also include a second complementary connector 140 and a prong opening 150. The prong opening 150 can extend through the attachment device 110. The prong opening 150 can be configured to receive the pair of conductive prongs 120 so that the pair of conductive prongs 120 extend through the attachment device 100 at the prong opening 150. The fixation aperture 135 and the second complementary connector 140 can be spaced apart on the attachment device 110 by the prong opening 150.

The attachment device 110 can include one or more complementary connectors configured to couple to the adapter housing 115. This can include the second complementary connector 140. As shown in the illustrated embodiment, the second complementary connector 140 can be configured to couple to the adapter housing 115, for instance, when the attachment device 110 is in a particular position relative to the adapter housing 115. In the illustrated embodiment, the second complementary connector 140 is configured to couple to the adapter housing 115 when the attachment device 110 is in the extended position so as to thereby secure the attachment device 110 in place at the adapter housing 115 when the attachment device 110 is in the extended position. In the illustrated embodiment, the second complementary connector 140 includes a first projection 140a and a second projection 140b that is spaced from the first projection 140a. The first projection 140a can be configured to couple to the first receptacle 125a when the attachment device 110 is in the extended position, and the second projection 140b can be configured to couple to the second receptable 125b when the attachment device 110 is in the extended position. As shown in the illustrated example, each of the first and second projections 140a, 140b is defined at, and extends from, a first end portion 151 of the prong opening 150 opposite a second end portion 152 of the prong opening 150 adjacent the fixation aperture 135.

The attachment device 110 in the illustrated embodiment also includes a fourth complementary connector 145. The fourth complementary connector 145 can also be configured to couple to the adapter housing 115, for instance, when the attachment device 110 is in a particular position relative to the adapter housing 115. In the illustrated embodiment, the fourth complementary connector 145 is configured to couple to the adapter housing 115 when the attachment device 110 is in the retracted position so as to thereby secure the attachment device 110 in place at the adapter housing 115 when the attachment device 110 is in the retracted position. In the illustrated embodiment, the fourth complementary connector 145 includes a third projection 145a. The third projection 145a can be configured to couple to the third receptacle 130a when the attachment device 110 is in the retracted position. As shown in the illustrated example, the third projection 145a is defined at, and extends from, the second end portion 152 of the prong opening 150 adjacent the fixation aperture 135.

FIGS. 1A and 1B illustrate the attachment device 110 in retracted and extended positions. Specifically, FIG. 1A is a perspective view of the adapter mechanism 100 with the attachment device 110 in an exemplary retracted position, and FIG. 1B is a perspective view of the adapter mechanism 100 with the attachment device 110 in an exemplary extended position. The attachment device 110 can be configured to move, relative to the adapter housing 115, between a retracted position, such as that shown in FIG. 1A, and an extended position, such as that shown in FIG. 1B.

When the attachment device 110 is in the retracted position, such as that shown in FIG. 1A, the second complementary connector 140 can be uncoupled from the first complementary connector 125. But, in this embodiment, to secure the attachment device 110, relative to the adapter housing 115, at the retracted position, the fourth complementary connector 140 can be coupled to the third complementary connector 130. Also, when the attachment device 110 is in the retracted position, such as that shown in FIG. 1A, the fixation aperture 135 can interface with the adapter housing 115. For instance, as shown in the illustrated example, when the attachment device 110 is in the retracted position, the adapter housing 115 can block the fixation aperture 135 from receiving a fixation element through the fixation aperture 135. In some such cases, an end on the fixation aperture 135, interfacing with the adapter housing 115, can contact the adapter housing 115. When the attachment device 110 is in the retracted position, the adapter mechanism 100 can be relatively more compact than when the attachment device 110 is in the extended position.

When the attachment device 110 is in the extended position, such as that shown in FIG. 1B, the fixation aperture 135 can be extended out from the adapter housing 115 and the second complementary connector 140 can be coupled to the first complementary connector 125 to secure the attachment device 110 in place at the adapter housing 115. Likewise, in this embodiment, when the attachment device 110 is in the extended position, the fourth complementary connector 140 can be uncoupled from the third complementary connector 130. When the attachment device 110 is in the extended position, the adapter mechanism 100 can be relatively less compact than when the attachment device 110 is in the extended position. In particular, as shown in FIG. 1B, the attachment device 110 can extend out from the adapter housing 115 an extension distance 155. The extension distance 155 can be greater when the attachment device 110 is in the extended position than when the attachment device 110 is in the retracted position, thus rendering the adapter mechanism 100 relatively more compact when in the retracted position than when in the extended position.

As noted, the attachment device 110 configured to move, relative to the adapter housing 115, between the retracted and extended positions. In in the illustrated embodiment of the adapter mechanism 100, the attachment device 110 is configured to slide along, and relative to, the adapter housing 115 from the retracted position to the extended position. By moving the attachment device 110 from the retracted position to the extended position, the fixation aperture 135 can be positioned so as to receive a fixation element through the fixation aperture. As such, the adapter mechanism 100 can be selectively placed into an installation configuration (e.g., the extended position of the attachment device) in which a fixation element is needed to fix the electrical adapter 105 to a wall adjacent the electrical outlet at which the pair of conductive prongs 120. And, the adapter mechanism 100 can be selectively placed into a relatively more compact installation configuration (e.g., the retracted position of the attachment device 110) when a fixation element is not needed to fix the electrical adapter 105 to a wall.

Figure 2A:
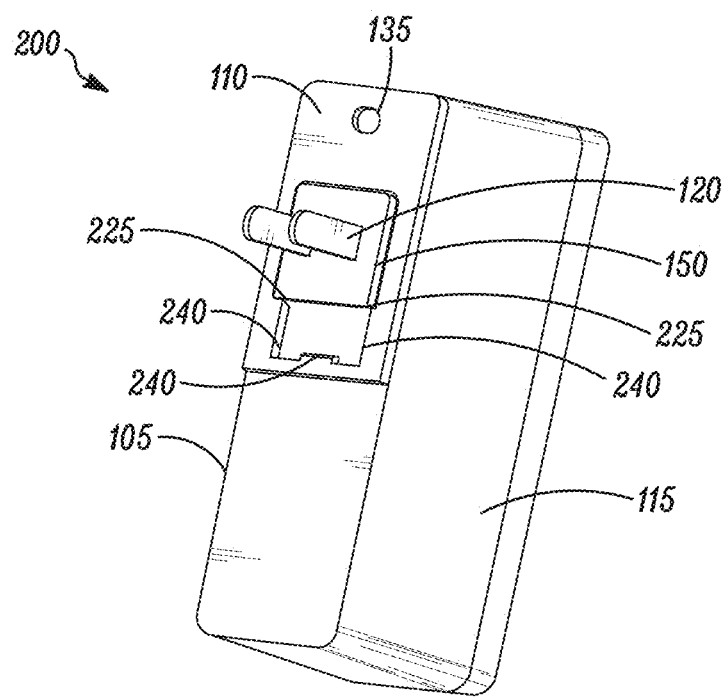
FIGS. 2A-2D illustrate another embodiment of an adapter mechanism.
Figure 2B:
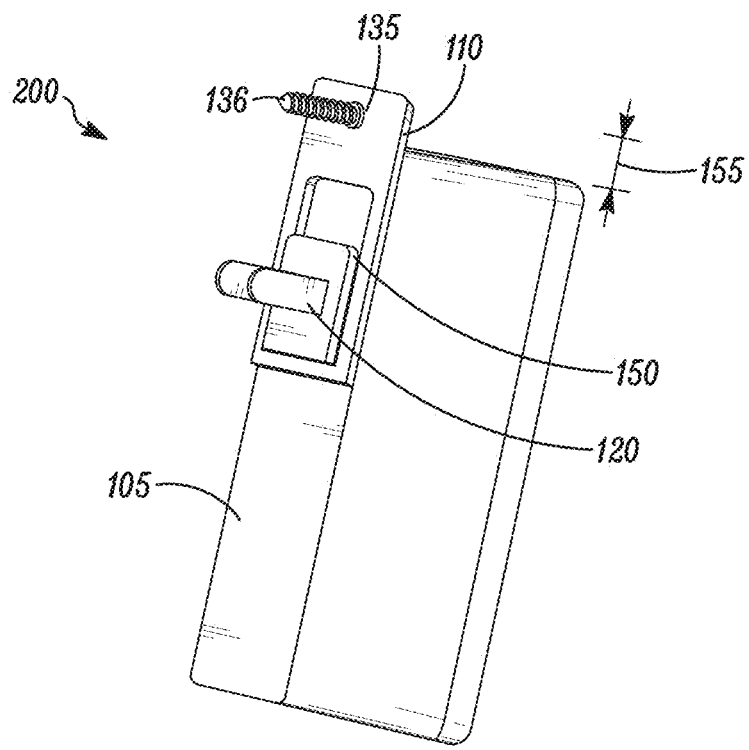

FIGS. 2A-2D show another embodiment of an adapter mechanism 200. The adapter mechanism 200 can be similar to the adapter mechanism 100 described previously herein and like reference characters are used to denote like elements. The adapter mechanism 200 can include the electrical adapter 105 and the attachment device 110. And, as shown in FIGS. 2A and 2B, and as will be described further below, the attachment device 110 can be configured to move between the retracted position, an example of which is shown in FIG. 2A, and the extended position, an example of which is shown in FIG. 2B.

Figure 2C:
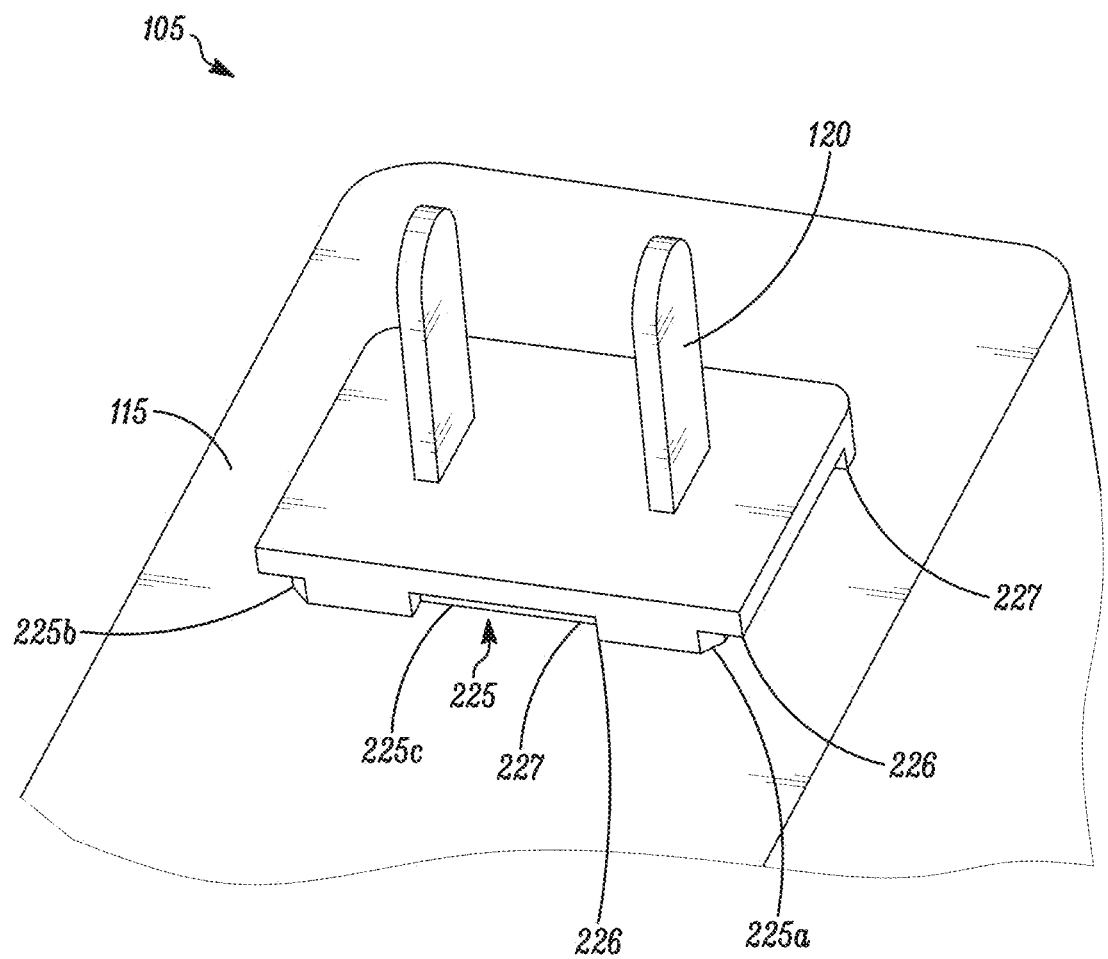

FIG. 2C illustrates a perspective view of the electrical adapter 105 in isolation. The electrical adapter 105 can include the adapter housing 115 and the pair of conductive prongs 120, such as described previously. The adapter housing 115 can include one or more complementary connectors configured to couple to the attachment device 110. As shown in the illustrated embodiment, the adapter housing 115 can include a first complementary connector 225. The first complementary connector 225 can be configured to couple to the attachment device 110, for instance, when the attachment device 110 is in a particular position relative to the adapter housing 115. In the illustrated embodiment, the first complementary connector 225 is configured to couple to the attachment device 110 when the attachment device 110 is in an extended position so as to thereby secure the attachment device 110 in place at the adapter housing 115 when the attachment device 110 is in the extended position. In the illustrated embodiment, the first complementary connector 225 includes a first receptacle 225a, a second receptacle 225b that is spaced apart from the first receptacle 225a, and a third receptacle 225c that is spaced apart from each of the first receptacle 225a and the second receptacle 225c. Each of the first, second, and third receptacles 225a, 225b, 225c can be defined by the adapter housing 115 (e.g., adjacent the pair of conductive prongs 120). In the illustrated embodiment, each of the first, second, and third receptacles 225a, 225b, 225c is defined as a slot at the adapter housing 115. The slot defined by each of the of the first, second, and third receptacles 225a, 225b, 225c is open at one end portion 226 of each of the first, second, and third receptacles 225a, 225b, 225c and closed at a second, opposite end portion 227 of each of the first, second, and third receptacles 225a, 225b, 225c. The illustrated embodiment of the adapter housing 115 may not include the third complementary connector 130 as is present in the embodiment illustrated in FIGS. 1A-1D.

Figure 2D:
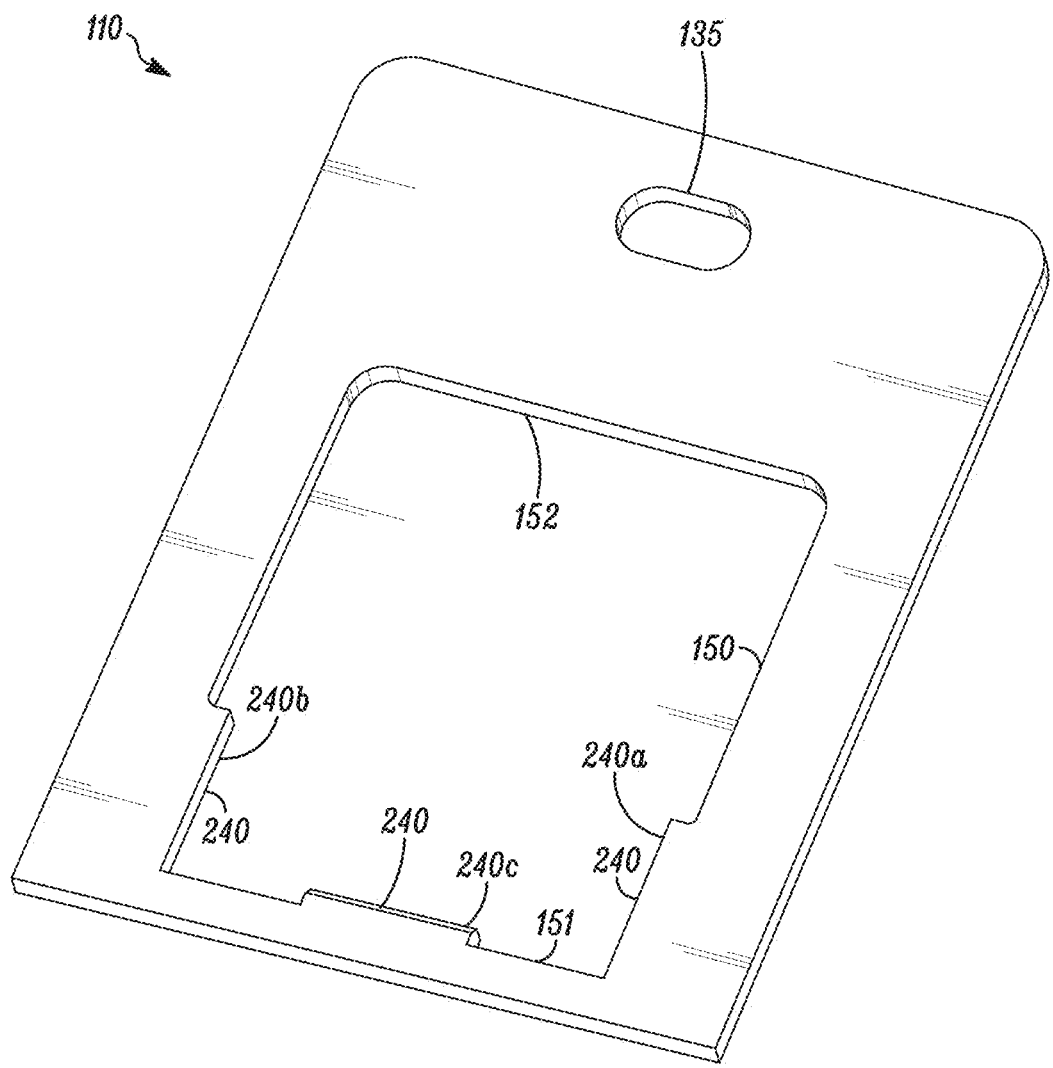

FIG. 2D illustrates a perspective view of the attachment device 110 in isolation. The attachment device 110 can include the fixation aperture 135, a second complementary connector 240, and the prong opening 150. The second complementary connector 240 can be configured to couple to the adapter housing 115, for instance, when the attachment device 110 is in a particular position relative to the adapter housing 115. In the illustrated embodiment, the second complementary connector 240 is configured to couple to the adapter housing 115 when the attachment device 110 is in the extended position so as to thereby secure the attachment device 110 in place at the adapter housing 115 when the attachment device 110 is in the extended position. In the illustrated embodiment, the second complementary connector 240 includes a first projection 240a, a second projection 240b that is spaced from the first projection 240a, and a third projection 240c that is spaced from each of the first and second projections 240a, 240b. When the attachment device 110 is in the extended position, the first projection 240a can be configured to couple to the first receptacle 225a, the second projection 240b can be configured to couple to the second receptable 225b, and the third projection 240c can be configured to couple to the third receptacle 225c. As shown in the illustrated example, each of the first, second, and third projections 240a, 240b, 240c is defined at, and extends from, the first end portion 151 of the prong opening 150 opposite the second end portion 152 of the prong opening 150 adjacent the fixation aperture 135. The illustrated embodiment of the adapter housing 115 may not include the fourth complementary connector 145 as is present in the embodiment illustrated in FIGS. 1A-1D.

FIGS. 2A and 2B illustrate the attachment device 110 in retracted and extended positions. Specifically, FIG. 2A is a perspective view of the adapter mechanism 200 with the attachment device 110 in an exemplary retracted position, and FIG. 2B is a perspective view of the adapter mechanism 200 with the attachment device 110 in an exemplary extended position. The attachment device 110 can be configured to move, relative to the adapter housing 115, between a retracted position, such as that shown in FIG. 2A, and an extended position, such as that shown in FIG. 2B.

When the attachment device 110 is in the retracted position, such as that shown in FIG. 2A, the second complementary connector 240 can be uncoupled from the first complementary connector 225. Also, when the attachment device 110 is in the retracted position, such as that shown in FIG. 2A, the fixation aperture 135 can interface with the adapter housing 115 as described previously with respect to the embodiment of the adapter mechanism 100 of FIGS. 1A-1D. When the attachment device 110 is in the retracted position, the adapter mechanism 200 can be relatively more compact than when the attachment device 110 is in the extended position.

When the attachment device 110 is in the extended position, such as that shown in FIG. 2B, the fixation aperture 135 can be extended out from the adapter housing 115 and the second complementary connector 240 can be coupled to the first complementary connector 225 to secure the attachment device 110 in place at the adapter housing 115. When the attachment device 110 is in the extended position, the adapter mechanism 200 can be relatively less compact than when the attachment device 110 is in the extended position. In particular, as shown in FIG. 2B, the attachment device 110 can extend out from the adapter housing 115 the extension distance 155 as described previously.

As noted, the attachment device 110 configured to move, relative to the adapter housing 115, between the retracted and extended positions. In in the illustrated embodiment of the adapter mechanism 200, the attachment device 110 is configured to slide along, and relative to, the adapter housing 115 from the retracted position to the extended position. By moving the attachment device 110 from the retracted position to the extended position, the fixation aperture 135 can be positioned so as to receive a fixation element 136 through the fixation aperture 135. As such, the adapter mechanism 200 can be selectively placed into an installation configuration (e.g., the extended position of the attachment device) in which the fixation element 136 is needed to fix the electrical adapter 105 to a wall adjacent the electrical outlet at which the pair of conductive prongs 120. And, the adapter mechanism 200 can be selectively placed into a relatively more compact installation configuration (e.g., the retracted position of the attachment device 110) when the fixation element 136 is not needed to fix the electrical adapter 105 to a wall.

Figure 3A:
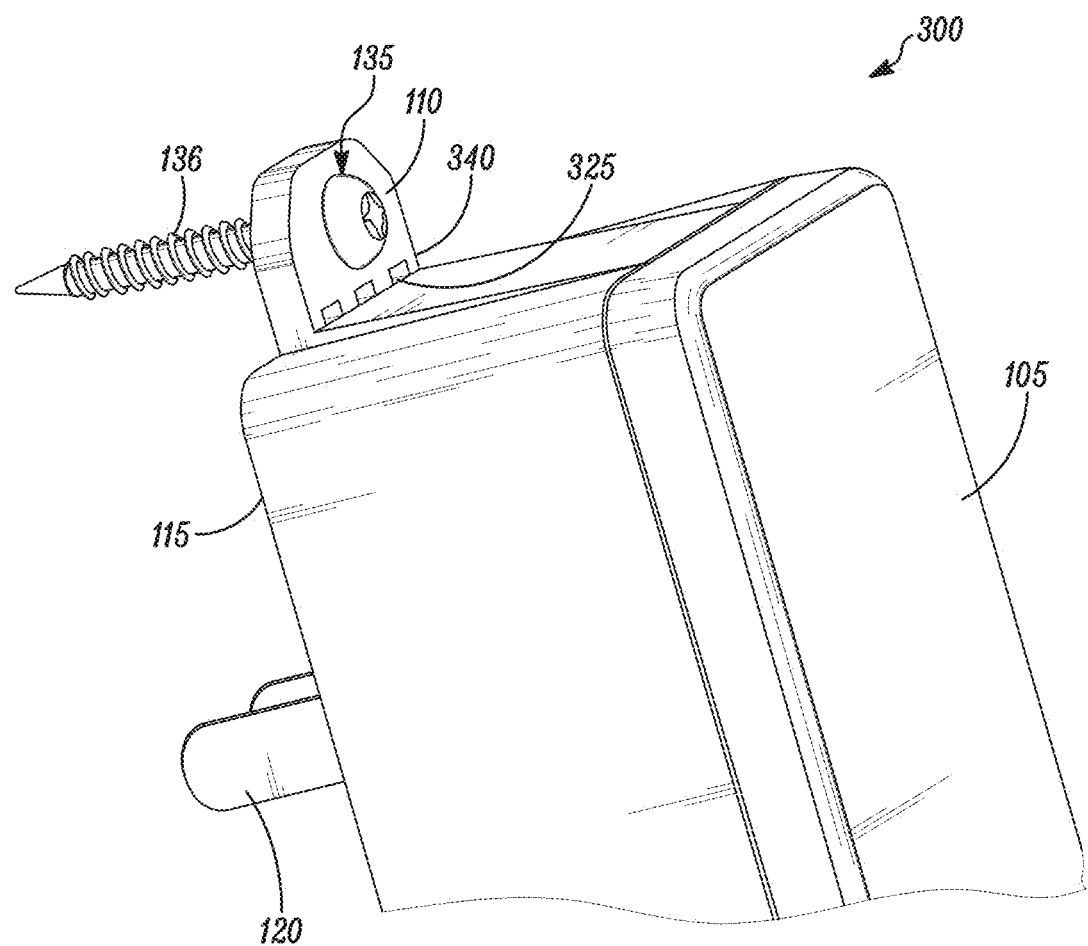
FIGS. 3A-3B illustrate a further embodiment of an adapter mechanism.
Figure 3B:
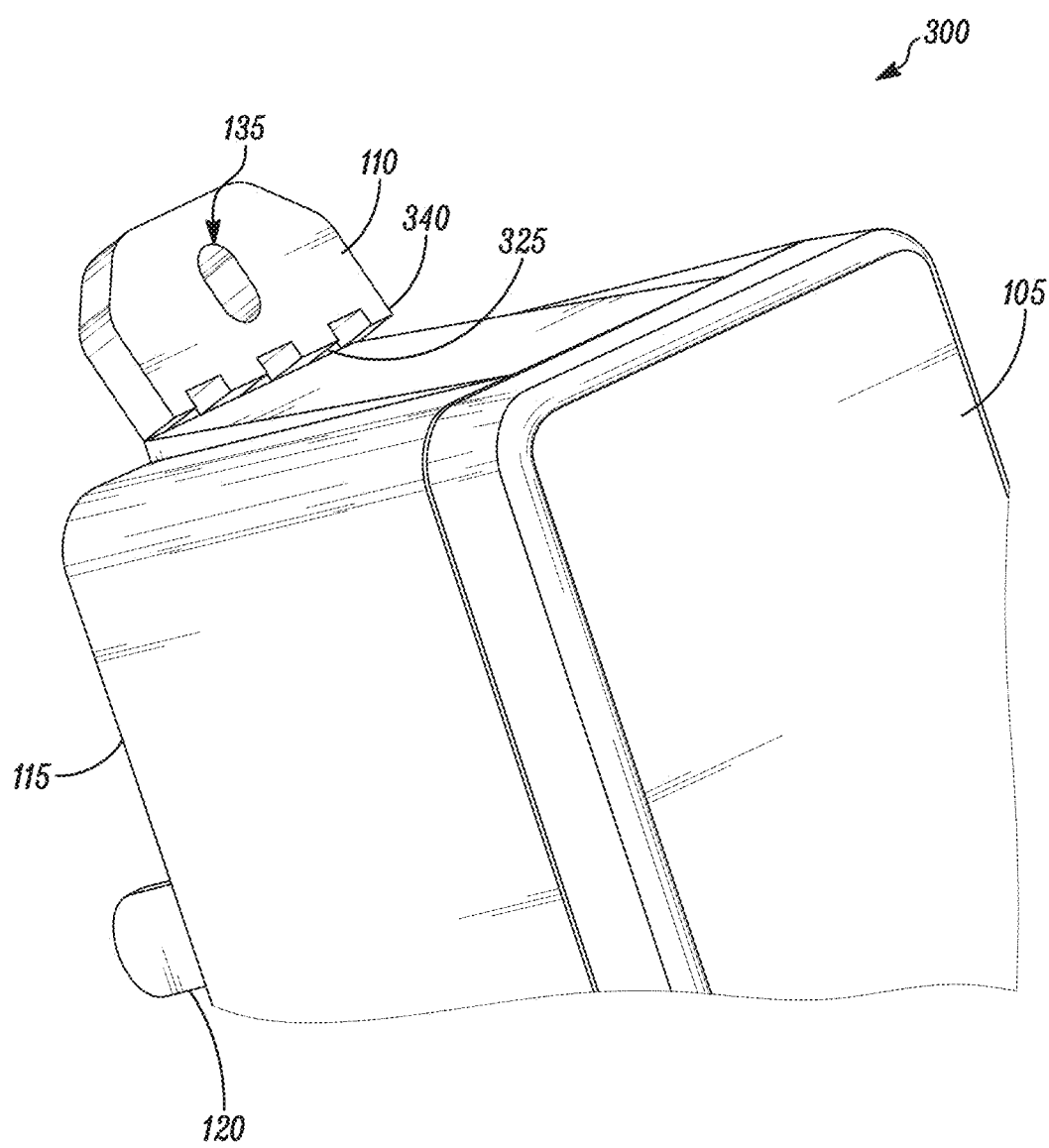

FIGS. 3A and 3B illustrate yet another embodiment of an adapter mechanism 300. The adapter mechanism 300 can be similar to the adapter mechanisms 100 and 200 described previously herein and like reference characters are used to denote like elements. The adapter mechanism 300 can include the electrical adapter 105 and the attachment device 110. And, as shown in FIGS. 3A and 3B, and as will be described further below, the attachment device 110 can be configured to move between the retracted position and the extended position. Specifically, FIG. 3A is a perspective view of the adapter mechanism 300 with the attachment device 110 in an extended position, and FIG. 3B is a perspective view of the adapter mechanism 300 with the attachment device 110 being moved toward a retracted position.

As shown in the illustrated embodiment, the adapter housing 115 can include a first complementary connector 325. The first complementary connector 325 can be configured to couple to the attachment device 110, for instance, when the attachment device 110 is in an extended position so as to thereby secure the attachment device 110 in place at the adapter housing 115. In the illustrated embodiment, the first complementary connector 325 includes a first perforated connector. The first perforated connector can extend along the contacting interface between the attachment device 110 and the adapter housing 115. The first perforated connector can be defined by the adapter housing 115 and/or be a removable connected component at the adapter housing 115.

As also shown in the illustrated embodiment, the attachment device 110 can include the fixation aperture 135 and a second complementary connector 340. The second complementary connector 340 can be configured to couple to the adapter housing 115, for instance, when the attachment device 110 is in the extended position so as to thereby secure the attachment device 110 in place at the adapter housing 115. In the illustrated embodiment, the second complementary connector 340 includes a second perforated connector that is complementary to the first perforated connector of the first complementary connector 325. When the attachment device 110 is in the extended position, such as that shown in FIG. 3A, the second complementary connector 340 can be configured to couple to the first complementary connector 325 such that the first perforated connector and the second perforated connector form a perforated connection between the attachment device 110 and the adapter housing 115.

FIG. 3B illustrates the attachment device 110 being moved to the retracted position. The attachment device 110 can be configured to move, relative to the adapter housing 115, from the extended position, such as that shown in FIG. 3A, to a retracted position. A retracted position for the adapter mechanism 300 can be defined, for example, as an angle formed between the first complementary connector 325 and the second complementary connector 340 that is other than ninety degrees. As shown in FIG. 3B, the attachment device 110 has been moved relative to the adapter housing 115 to be at an angle between zero and ninety degrees relative to a plane extending along the surface of the adapter housing 115 at which the first and second complementary connectors 325, 340 are coupled.

In some cases, the retracted position of the attachment device 110 can include removal of the attachment device 110 from the adapter housing 115. For example, the perforated connection formed by the first perforated connector, of the first complementary connector 325, and the second perforated connector, of the second complementary connector 340 can be configured to allow the attachment device 110 to be selectively removed from the adapter housing 115 at the interface of the first and second complementary connectors 325, 340. Thus, moving the attachment device 110 to the retracted position can include rotating the attachment device 110 relative to the adapter housing 115 via the perforated connection therebetween so as to uncouple the second complementary connector 340 from the first complementary connector 325 and remove the attachment device 110 from the adapter housing 115. Thus, when the attachment device 110 is in the extended position, the fixation aperture 135 can be extended out from the adapter housing 115 and the second complementary connector 340 can be coupled to the first complementary connector 325 to secure the attachment device 110 in place at the adapter housing 115. And, when the attachment device 110 is in the retracted position, the second complementary connector 340 can be rotated relative to the first complementary connector 25 and/or uncoupled from the first complementary connector 325 via the interface between the first and second complementary connectors 325, 340.

Figure 4:
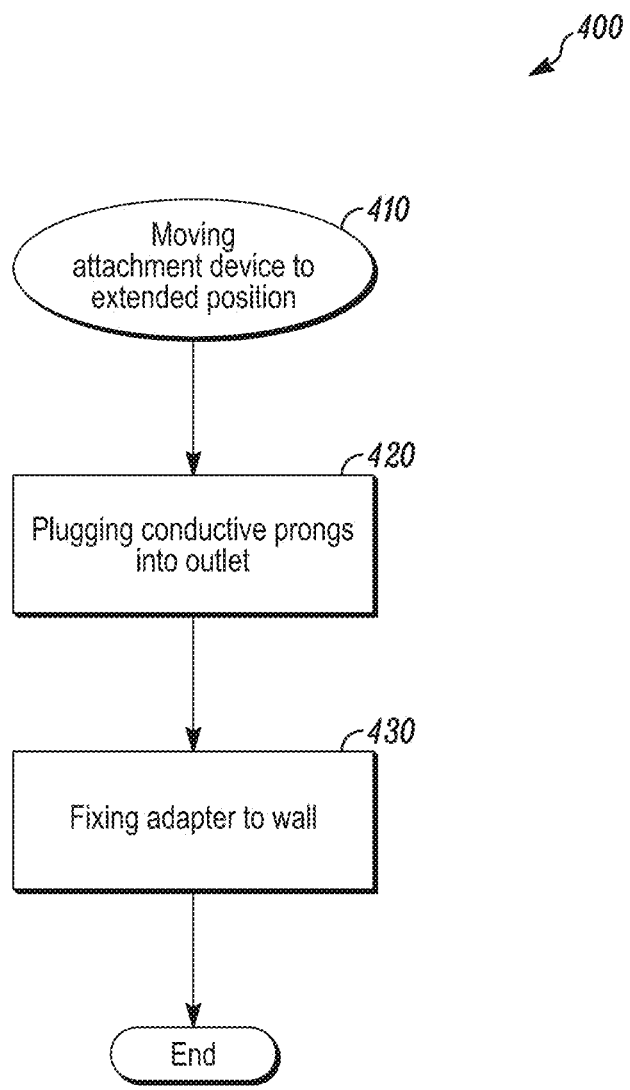
FIG. 4 is a flow diagram of a method of installing an adapter mechanism at an electrical outlet.

FIG. 4 is a flow diagram of a method 400 of installing an adapter mechanism at an electrical outlet. The adapter mechanism can include an electrical adapter, such as the electrical adapter illustrated and/or described elsewhere herein, and an attachment device, such as the attachment device illustrated and/or described elsewhere herein. And, other features described with respect to the method 400 can be the same as, or similar to, the corresponding features illustrated and/or described elsewhere herein At step 410, the method 400 includes moving the attachment device, relative to an adapter housing of the electrical adapter, from a retracted position to an extended position. In some embodiments, moving the attachment device, relative to an adapter housing of the electrical adapter, from the retracted position to the extended position includes sliding the attachment device along the adapter housing from the retracted position to the extended position. In some embodiments, moving the attachment device, relative to an adapter housing of the electrical adapter, from the retracted position to the extended position includes rotating the attachment device relative to the adapter housing from the extended position to the retracted position.

When the attachment device is in the retracted position, a second complementary connector of the attachment device can be uncoupled from a first complementary connector of the adapter housing. For example, in some embodiments, wherein when the attachment device is in the retracted position the fixation aperture can interface with the adapter housing. And, when the attachment device is in the extended position, a fixation aperture of the attachment device can be extended out from the adapter housing and the second complementary connector can be coupled to the first complementary connector to secure the attachment device in place at the adapter housing. For example, in some embodiments when the attachment device is in the extended position, the electrical adapter can be fixed to the wall adjacent the electrical outlet by a fixation element placed through the fixation aperture.

At step 420, the method 400 includes plugging a pair of conductive prongs of the electrical adapter into an electrical outlet. For example, in one embodiment, the pair of conductive prongs can be plugged into the electrical outlet when the attachment device is in the extended position. The pair of conductive prongs of the electrical adapter can extend through the attachment device via a prong opening defined at the attachment device. For instance, the pair of conductive prongs of the electrical adapter can extend through the attachment device via the prong opening when the attachment device is in the retracted position and when the attachment device is in the extended position. In some embodiments, the fixation aperture and the second complementary connector can be spaced apart on the attachment device by the prong opening. Also, in some embodiments, the second complementary connector of the attachment device can be defined at a first end portion of the prong opening opposite a second end portion of the prong opening adjacent the fixation aperture.

At step 430, the method 400 includes fixing the electrical adapter to a wall adjacent the electrical outlet, via at least the fixation aperture, when the attachment device is in the extended position.

Various examples have been described. These and other examples are within the scope of the following claims.

What is claimed is:

1. An adapter mechanism comprising:
   an electrical adapter, the electrical adapter comprising an adapter housing and a pair of conductive prongs, the adapter housing comprising a first complementary connector, and the pair of conductive prongs configured to be inserted into an electrical outlet; and
   an attachment device, the attachment device comprising a fixation aperture and a second complementary connector, wherein the attachment device is configured to move relative to the adapter housing between a retracted position and an extended position, wherein when the attachment device is in the retracted position the second complementary connector is uncoupled from the first complementary connector, and wherein when the attachment device is in the extended position the fixation aperture is extended out from the adapter housing and the second complementary connector is coupled to the first complementary connector to secure the attachment device in place at the adapter housing.

2. The adapter mechanism of claim 1, wherein when the attachment device is in the retracted position the fixation aperture interfaces with the adapter housing.

3. The adapter mechanism of claim 2, wherein when the attachment device is in the retracted position the adapter housing blocks the fixation aperture from receiving a fixation element through the fixation aperture.

4. The adapter mechanism of claim 1, wherein the attachment device further comprises a prong opening extending through the attachment device.

5. The adapter mechanism of claim 4, wherein the prong opening is configured to receive the pair of conductive prongs to extend through the attachment device.

6. The adapter mechanism of claim 4, wherein the fixation aperture and the second complementary connector are spaced apart on the attachment device by the prong opening.

7. The adapter mechanism of claim 1, wherein the fixation aperture is configured to receive a fixation element to fix the electrical adapter to a wall adjacent the electrical outlet.

8. The adapter mechanism of claim 1, wherein the attachment device is configured to slide along the adapter housing from the retracted position to the extended position.

9. The adapter mechanism of claim 1, wherein the first complementary connector comprises a first receptacle, and wherein the second complementary connector comprises a first projection configured to couple to the first receptacle when the attachment device is in the extended position.

10. The adapter mechanism of claim 9, wherein the first complementary connector further comprises a second receptacle spaced apart from the first receptacle, and wherein the second complementary connector further comprises a second projection, spaced from the first projection, configured to be coupled to the second receptacle when the attachment device is in the extended position.

11. The adapter mechanism of claim 9, wherein the attachment device further comprises a prong opening extending through the attachment device, and wherein the first projection is defined at a first end portion of the prong opening opposite a second end portion of the prong opening adjacent the fixation aperture.

12. A method of installing an adapter mechanism at an electrical outlet, the adapter mechanism comprising an electrical adapter and an attachment device, the method comprising the steps of:
   moving the attachment device, relative to an adapter housing of the electrical adapter, from a retracted position to an extended position, wherein when the attachment device is in the retracted position a second complementary connector of the attachment device is uncoupled from a first complementary connector of the adapter housing, and wherein when the attachment device is in the extended position a fixation aperture of the attachment device is extended out from the adapter housing and the second complementary connector is coupled to the first complementary connector to secure the attachment device in place at the adapter housing;
   plugging a pair of conductive prongs of the electrical adapter into an electrical outlet; and
   fixing the electrical adapter to a wall adjacent the electrical outlet, via at least the fixation aperture, when the attachment device is in the extended position.

13. The method of claim 12, wherein the pair of conductive prongs is plugged into the electrical outlet when the attachment device is in the extended position.

14. The method of claim 12, wherein when the attachment device is in the retracted position the fixation aperture interfaces with the adapter housing.

15. The method of claim 12, wherein the pair of conductive prongs of the electrical adapter extend through the attachment device via a prong opening defined at the attachment device.

16. The method of claim 15, wherein the pair of conductive prongs of the electrical adapter extend through the attachment device via the prong opening when the attachment device is in the retracted position and when the attachment device is in the extended position.

17. The method of claim 15, wherein the fixation aperture and the second complementary connector are spaced apart on the attachment device by the prong opening.

18. The method of claim 15, wherein the second complementary connector of the attachment device is defined at a first end portion of the prong opening opposite a second end portion of the prong opening adjacent the fixation aperture.

19. The method of claim 12, wherein the electrical adapter is fixed to the wall adjacent the electrical outlet when the attachment device is in the extended position by a fixation element placed through the fixation aperture.

20. The method of claim 12, wherein moving the attachment device, relative to an adapter housing of the electrical adapter, from the retracted position to the extended position comprises sliding the attachment device along the adapter housing from the retracted position to the extended position.

* * * * *